Oct. 2, 1923.

J. KUBLER 1,469,418

APPARATUS FOR OPERATING DIRECT CURRENT THREE-MAIN SUPPLY CIRCUITS
BY MEANS OF METAL VAPOR RECTIFIERS

Filed Aug. 31, 1921

Inventor
J. Kubler,
By Marks & Clerk
Attys.

Patented Oct. 2, 1923.

1,469,418

UNITED STATES PATENT OFFICE.

JOHANN KUBLER, OF BADEN, SWITZERLAND, ASSIGNOR TO AKTIENGESELLSCHAFT BROWN, BOVERI & CIE., OF BADEN, SWITZERLAND.

APPARATUS FOR OPERATING DIRECT-CURRENT THREE-MAIN SUPPLY CIRCUITS BY MEANS OF METAL VAPOR RECTIFIERS.

Application filed August 31, 1921. Serial No. 497,432.

*To all whom it may concern:*

Be it known that I, JOHANN KUBLER, a citizen of the Swiss Republic, residing at No. 11 Schlossbergweg, Baden, Switzerland, have invented certain new and useful Improvements in Apparatus for Operating Direct-Current Three-Main Supply Circuits by Means of Metal Vapor Rectifiers (for which I have filed applications in Germany May 20, 1916, and Switzerland, May 18, 1917), of which the following is a specification.

The operation of three-main supply circuits by connecting two direct current generators together in series, and connecting the zero main to the connecting lead between them, is, as is well known, also applicable to cases where the direct current generators are constituted by metal vapor rectifiers.

I have now discovered a further and improved connection which in certain circumstances is to be preferred to the known connection herein above described.

The improved connection which forms the subject matter of the present invention, comprises a main rectifier for feeding (with voltage) the outer mains of the supply circuit, and two auxiliary rectifiers which supply the part-voltages. The negative outer main is connected to the centre of a choking coil or transformer winding to whose outer terminals the anodes of the main rectifier are connected; its cathode is connected to the cathode of one of the two auxiliary rectifiers and forms the connection of the positive outer main of the supply circuit. The anodes of this auxiliary rectifier are connected to the outer terminals of a secondary auxiliary winding having half the number of turns of the aforesaid choking coil or transformer winding; these windings may be located on the same iron body or on separate iron bodies.

The centre of the auxiliary winding is connected to the cathode of the second auxiliary rectifier, and constitutes the point of connection of the middle main of the three-main supply circuit.

The anodes of the second auxiliary rectifier are connected to tapping points of the main transformer or main choking coil that are located midway between the neutral point and the outer terminals, or to special windings.

In the accompanying drawing wherein is illustrated an improved embodiment of the invention:

Figure 1:
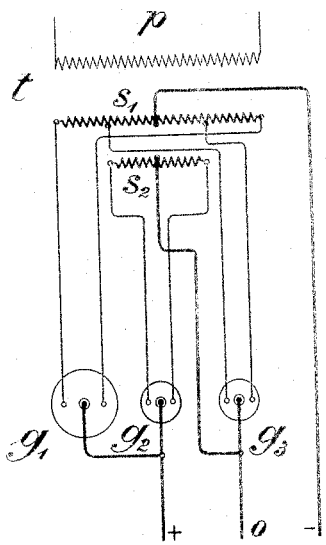
Fig. 1 is a diagrammatic view of one form of the improved apparatus.

Referring in detail to the drawing there is shown a three-main installation that is fed from a single-phase alternating current supply circuit. To this latter there is connected the primary winding $p$ of the transformer $t$. The negative outer main of the direct current supply circuit is connected to the middle of the second main winding $s_1$ of the transformer $t$. The anodes of the main rectifier $g_1$ are connected to the ends of the said winding $s_1$. The anodes of the auxiliary rectifier $g_3$ are connected to the tapping points intermediate of the said ends. The secondary auxiliary winding $s_2$ (which has only one half of the number of turns as the main winding $s_1$) feeds the anodes of the auxiliary rectifier $g_2$, whilst the middle of this auxiliary winding is connected to the middle main (zero main) of the three-main supply circuit. The middle or zero main is likewise connected to the cathode of the rectifier $g_3$. The positive outer main of the three-main supply circuit is fed from the cathodes of the rectifiers $g_1$ and $g_2$ which are connected together.

In the case of uniform load on the halves of the supply circuit, the load is distributed in proportion to the outputs of the rectifiers in such a manner that no current flows in the zero main.

In the case of a pure load on the outer mains the rectifiers $g_2$ and $g_3$ carry no current.

In the case of a purely one-sided load the rectifier $g_1$ carries no current.

When the positive half of the supply circuit is running idle, only the rectifier $g_3$ is working, because its anodes are fed from the middle portion of the winding $s_1$ and its cathode constitutes the positive pole of the supply circuit whereas the negative pole is situated in the middle of the winding $s_1$.

When the negative half of the supply circuit is running idle only the rectifier $g_2$ is working since its anodes are fed from the auxiliary winding $s_2$ whose middle point constitutes the negative pole of the supply circuit. The connections are the same when the supply circuit is fed from a polyphase alternating current supply circuit.

A repetition of the illustrated single-phase connection for each phase, reduces at once the connections for the respective polyphase supply circuit; the number of anodes of each rectifier being usually made equal to the phase number in the known way, in each case.

Figure 2:
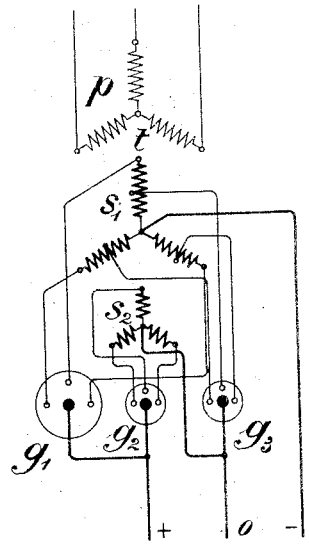
Fig. 2 is a similar view of a modification thereof.

Fig. 2 illustrates an example of the connections for the phases. In polyphase supply circuits, the various rectifiers may also be connected to windings that are shifted in phase relatively to one another or are of different phases. An example of this is the case where the winding $s$ of Fig. 2 is constructed in the form of what is known as a zig-zag connection.

What I claim is:—

1. Apparatus for operating direct current three wire circuits by means of metal vapor rectifiers including a transformer having a primary winding, a secondary winding and an auxiliary secondary winding having half the number of turns of the main secondary winding, a main rectifier, two auxiliary rectifiers and the following electrical connections; a negative main for the three wire circuit connected to the neutral point of the main secondary winding, a middle main for the three wire circuit connected to the neutral point of the auxiliary secondary winding and to the cathode of the second auxiliary rectifier, a positive main for the three wire circuit connected to the cathodes of the main rectifier and the first auxiliary rectifier, connections from the anodes of the main rectifier to the ends of the main secondary transformer winding, connections from the anodes of the second auxiliary rectifier to the ends of the auxiliary secondary transformer winding and connections from the anodes of the first auxiliary rectifier to intermediate tapping points on the main secondary winding.

2. Apparatus as claimed in claim 1, characterized by the feature that the auxiliary secondary winding is wound on a transformer distinct from the main transformer.

In testimony whereof I have signed my name to this specification.

JOHANN KUBLER.